(12) United States Patent
Crepin et al.

(10) Patent No.: US 11,247,678 B2
(45) Date of Patent: Feb. 15, 2022

(54) METHOD AND DEVICE FOR OPERATING A MOTOR VEHICLE CAPABLE OF PARTLY OR FULLY AUTONOMOUS DRIVING

(71) Applicant: Robert Bosch GmbH, Stuttgart (DE)

(72) Inventors: Bettina Crepin, Stuttgart (DE); Leo Michels, Oppenweiler (DE); Thomas Brettschneider, Leonberg (DE); Toni Frenzel, Heilbronn (DE)

(73) Assignee: Robert Bosch GmbH, Stuttgart (DE)

( * ) Notice: Subject to any disclaimer, the term of this patent is extended or adjusted under 35 U.S.C. 154(b) by 197 days.

(21) Appl. No.: 16/156,563

(22) Filed: Oct. 10, 2018

(65) Prior Publication Data

US 2019/0118817 A1    Apr. 25, 2019

(30) Foreign Application Priority Data

Oct. 19, 2017 (DE) .......................... 102017218669.0

(51) Int. Cl.
| | |
|---|---|
| *B60W 30/18* | (2012.01) |
| *B62D 15/02* | (2006.01) |
| *B60W 10/04* | (2006.01) |
| *B60W 10/184* | (2012.01) |
| *G05D 1/00* | (2006.01) |
| *B62D 6/00* | (2006.01) |

(52) U.S. Cl.
CPC ...... *B60W 30/18027* (2013.01); *B60W 10/04* (2013.01); *B60W 10/184* (2013.01); *B62D 15/0285* (2013.01); *G05D 1/0088* (2013.01); *B60T 2270/10* (2013.01); *B60T 2270/30* (2013.01); *B60W 2520/28* (2013.01); *B60W 2552/15* (2020.02); *B60W 2710/0666* (2013.01); *B60W 2710/083* (2013.01); *B60W 2710/18* (2013.01); *B62D 6/001* (2013.01)

(58) Field of Classification Search
None
See application file for complete search history.

(56) References Cited

U.S. PATENT DOCUMENTS

| | | | | |
|---|---|---|---|---|
| 8,788,169 | B2* | 7/2014 | Nedachi | F16D 48/066 |
| | | | | 701/68 |
| 9,499,144 | B2* | 11/2016 | Ye | G01P 3/487 |
| 2007/0027598 | A1* | 2/2007 | Mori | B60W 10/184 |
| | | | | 701/41 |

* cited by examiner

*Primary Examiner* — Yuen Wong
*Assistant Examiner* — Hongye Liang
(74) *Attorney, Agent, or Firm* — Norton Rose Fulbright US LLP; Gerard Messina

(57) ABSTRACT

A method for operating a motor vehicle having partial/full autonomous driving, having a plurality of wheels, a drive system for producing a drive torque at at least one of the wheels, and a brake system for producing at least one holding force for holding still at least one of the wheels, a rotational speed sensor being allocated to at least one of the wheels, which sensor produces a respective signal pulse for each of a plurality of positions of angular rotation of the associated wheel, a specifiable driving maneuver being performed as a function of the produced signal pulses. For a short path driving process starting from a standstill, the brake force is reduced until the rotational speed sensor produces a first signal pulse, and is then held at least temporarily constant until a specified number of signal pulses is produced, and subsequently is increased up to the holding force.

18 Claims, 4 Drawing Sheets

METHOD AND DEVICE FOR OPERATING A MOTOR VEHICLE CAPABLE OF PARTLY OR FULLY AUTONOMOUS DRIVING

RELATED APPLICATION INFORMATION

The present application claims priority to and the benefit of German patent application no. 10 2017 218 669.0, which was filed in Germany on Oct. 19, 2017, the disclosure of which is incorporated herein by reference.

FIELD OF THE INVENTION

The present invention relates to a method for operating a motor vehicle capable of partly or fully autonomous driving, having a plurality of wheels, a drive system for producing a drive torque at at least one of the wheels, and a brake system for producing at least one holding force for holding at least one of the wheels at a standstill, a rotational speed sensor being allocated to at least one of the wheels of the motor vehicle that produces a respective signal pulse for each of a plurality of positions of angular rotation of the wheel, a specifiable driving maneuver being carried out as a function of the produced signal pulses. In addition, the present invention relates to a device for operating a motor vehicle that is realized as described above.

BACKGROUND INFORMATION

In today's motor vehicles, driving functions are increasingly being used that enable partly or fully autonomous driving operation, intended to relieve the burden on the driver of the motor vehicle. For example, parking assistants are known that carry out a parking process in partly or fully autonomous fashion. Lane keeping assistants and traffic congestion assistants also make driving the motor vehicle easier for the driver.

These functions frequently make use of planning and regulator configurations that are primarily based on speed and acceleration signals, ascertained for example using rotational speed sensors allocated to the wheels. As a rule, such rotational speed sensors supply, for each rotation of a wheel, a specified number of signal pulses ("ticks"), the signal pulses being uniformly distributed over the circumference of the wheel, or over a full rotation of the wheel. Thus, the distance between two adjacent signal pulses on the wheel circumference is for example 1 to 2 cm.

For driving functions at lower speeds, above all for fully automated parking and maneuvering functions, it is difficult to derive the speed and/or acceleration signals from the rotational speed sensors with the required quality, because the number of signal pulses that can be acquired is small. If for example the driving speed is to be determined from the signal pulses of the rotational speed sensors, then a reliable speed value is obtainable only if the traveled path is already long enough that, for example, a braking process would already have to be introduced during a parking process. In this way, travel past the actual destination point could occur. Previously, other sensor configurations were therefore also used to make it possible to reliably track the movement of the motor vehicle.

SUMMARY OF THE INVENTION

The method according to the present invention having the features described herein has the advantage that the signal pulses of the one, or the plurality of, rotational speed sensors are used to carry out a short path driving process. Here the method according to the present invention makes it possible, despite a short driving path and the associated low driving speed, to reliably track the movement of the motor vehicle and thus to safely and reliably carry out the short path driving maneuver. According to the present invention, for this purpose it is provided that, in the case of a short path driving process as a specifiable driving maneuver starting from the stationary state, the braking force is first reduced until the rotational speed sensor produces a first signal pulse, and is then held at least temporarily constant until a specified number of signal pulses has been produced, and subsequently is increased up to the holding force. The present invention thus provides that to carry out a short path driving process the number of signal pulses is used for the actuation of the brake system and thus for the delimitation and setting of the traveled path. To this extent, a short path driving process is understood in particular as a parking maneuver, or entering or leaving a parking place, in which, in particular, only speeds below 20 km/h, in particular below 10 km/h, occur. To carry out the driving process, first the braking force is reduced. As soon as a first signal pulse is produced by a, or the, rotational speed sensor, the current brake force is held constant. Here it is assumed that at this braking force a low travel speed is reached that causes the wheels to roll, but that a further acceleration is at least largely prevented by the brake force held constant. Subsequently, the further signal pulses produced by the rotational speed sensor are counted and, as a function of the counted signal pulses, the driving process is ended by increasing the holding force as soon as a specified number of signal pulses has been produced. Because the number of signal pulses per rotation of a wheel is known, and the distance of the signal pulses from one another is also known, the traveled path can be easily and precisely determined or calculated as a function of the acquired number of signal pulses. The traveled path is thus first converted into the number of signal pulses to be produced as a function of the signal pulses per rotation of a wheel and of the wheel outer diameter, and subsequently, when the specified or calculated number of signal pulses has been reached, the braking force is again increased up to the holding force, which securely prevents rotation of at least one of the wheels, in order to bring the wheels of the vehicle again to a standstill and to end the driving maneuver. In this way, the destination point of the driving maneuver is safely reached.

According to an exemplary embodiment of the present invention, the number of signal pulses is specified as a function of a path to be traveled, as mentioned above. Here, in particular the outer diameter of the wheel, and the number of pulses per rotation of this wheel, are taken into account. In this way, an unambiguous tracking of the movement of the motor vehicle is ensured and the driving maneuver can be carried out precisely.

In addition, it may be provided that the time duration beginning with the production of the first signal pulse is acquired and is compared with a specifiable time span, and that when the time duration exceeds the time span the braking force is further reduced. According to this specific embodiment, the braking force is thus held constant after the production or acquisition of the first signal pulse only until the measured time duration since the duration of the first signal pulse exceeds the specified time span. It is then assumed that the braking force is still too great to enable further movement of the motor vehicle. In particular, the braking force is then further reduced until a further signal pulse is produced or acquired. The method then proceeds analogously to the specific embodiment described above, and the brake force is held constant until a total of a specified number of signal pulses has been produced.

In addition, it may be provided that for the short path driving process the drive system is controlled so as to produce a drive torque. In this way, it is ensured that the motor vehicle is set into motion even when it is situated on a horizontal plane. While in principle the driving process can also be realized through the inherent weight of the motor vehicle if the motor vehicle is situated on a corresponding incline, through the production of the drive torque it is ensured that the short path driving process can be carried out independent of the presence or orientation and/or magnitude of an incline.

In particular, it is provided that the drive torque is produced as a function of an incline in the direction of travel of the motor vehicle. The current slope of the roadway on which the motor vehicle is situated is ascertained for example by one or more inclination sensors or the like. As a function of the acquired slope, the drive torque is then produced in such a way that the motor vehicle moves in the desired direction as soon as the braking force has been reduced to a corresponding extent. In particular, the production of the drive torque and the reduction of the braking force are coordinated or matched in such a way that at least one torque equilibrium results at the wheels through which a rolling back of the motor vehicle in the direction opposite the desired direction is avoided. The torques, or the braking force and the drive torque, may be calibrated to one another in such a way that the drive torque is higher than the roll-off moment caused by the slope and the weight of the motor vehicle, so that the motor vehicle moves only in the desired direction of travel when the brake force is reduced.

According to a specific embodiment of the present invention, it is provided that the drive torque is produced before the brake force is reduced. This has the advantage that the motor vehicle is tensioned, or pre-tensioned, while at a standstill, and rolling back of the motor vehicle when the braking force is reduced is reliably prevented. In this way, the robustness of the driving function, or of the short path driving maneuver, is increased. As already mentioned, here as well the drive torque may be set as a function of the current roadway slope in order to reliably prevent the rolling back. In particular, the drive torque is taken back or reduced only upon reaching the last signal pulse of the specified number of signal pulses, so that a uniform driving movement of the motor vehicle up to the reaching of the destination position is insured, and in particular the motor vehicle is prevented from coming to a standstill prematurely, before reaching the target position.

According to an exemplary embodiment of the present invention, it is provided that a plurality of, in particular all, the wheels of the motor vehicle are each assigned a rotational speed sensor, and that the brake force is held constant and/or increased only when a signal pulse has been produced by at least two of the rotational speed sensors. In this way, the robustness of the method is further increased, because for example in the case of a bouncing of a signal pulse, for example if the motor vehicle is moving very slowly and the rotational speed sensor stands at the threshold of a signal pulse for a long time, a beginning movement of the motor vehicle is nonetheless robustly ascertained. In particular, the braking force is held constant or increased only when a first signal pulse has been produced by each of the rotational speed sensors.

In addition, it may be provided that a rotational speed sensor is assigned to each of a plurality, in particular all, of the wheels, and that the drive torque is not reduced until a first signal pulse has been produced by at least two, in particular by all, rotational speed sensors. In this way, it is ensured that at the beginning of the driving maneuver the motor vehicle is set into movement as a whole, and the counting of the signal pulses reliably leads to the specified destination. For the case in which the path to be traveled is not divisible by the signal pulses without a remainder, then in a further specific embodiment a whole-number rounding may be carried out. In particular, the number of signal pulses is rounded down, so that in this way the probability is increased that the traveled path never goes beyond the requested path. In this way, the safety of the driving function is increased because the probability of a collision, and in particular driving past the destination, decreases. The increasing of the braking force may be introduced with the next-to-last signal pulse of the number of signal pulses to be acquired, in order to at least approximately compensate the path additionally traveled during the braking process resulting from the blind travel before the first signal pulse when starting. In this way, the reaching, or traveling, of the requested path length is further improved.

The device according to the present invention having the features described herein is distinguished in that it is specifically set up to carry out the method according to the present invention. In this way, the advantages named above result. Further advantages and features and combinations of features result in particular from the above description and from the further descriptions herein.

In the following, the present invention is explained in more detail on the basis of the drawings.

DETAILED DESCRIPTION

Figure 1:
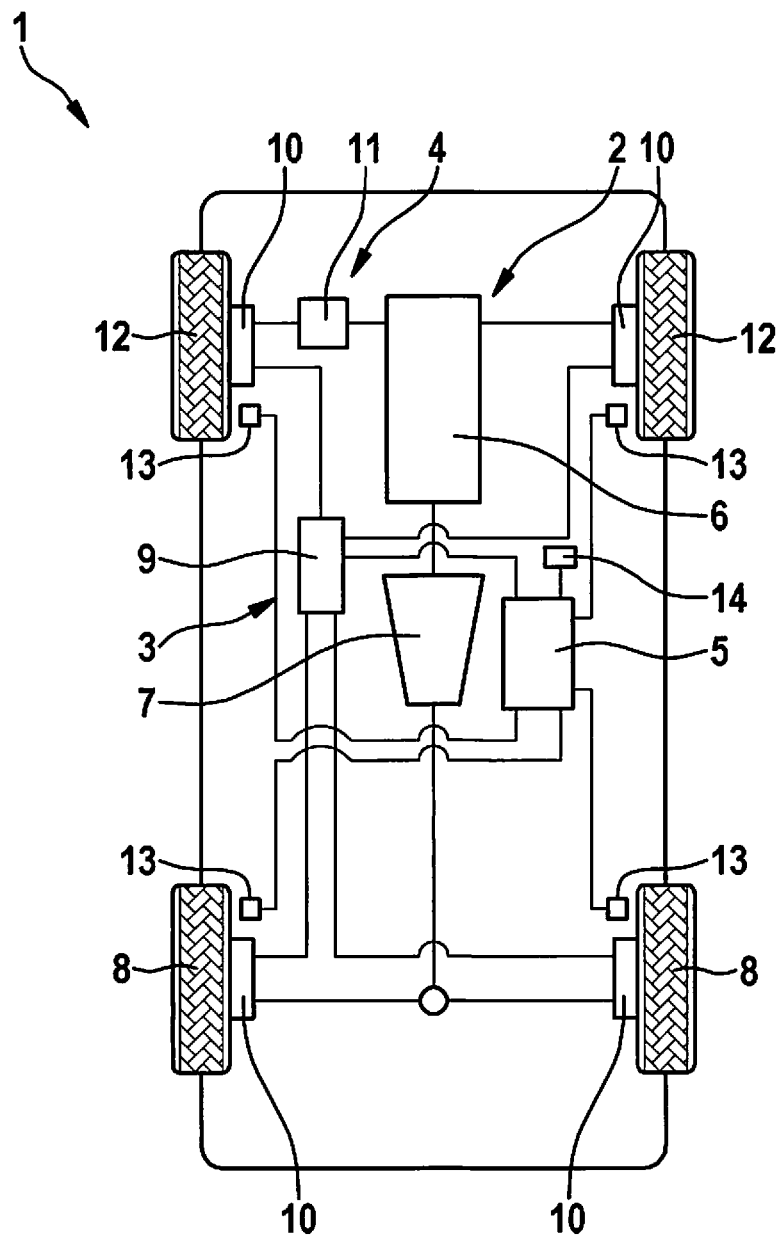
FIG. 1 shows a motor vehicle in a simplified plan view.

FIG. 1 shows, in a simplified plan view, a motor vehicle 1 having a drive system 2, a brake system 3, and a steering system 4, which are controllable by a control device 5 in order to carry out a fully or partly autonomous driving process of motor vehicle 1.

For this purpose, drive system 2 has a drive device 6, for example in the form of an internal combustion engine or electric motor, which is mechanically effectively connected, or capable of being effectively connected, to two wheels 8 of a rear wheel axle of motor vehicle 1 by an optional transmission 7.

Brake system 3 has a brake unit 9 that is connected, in particular hydraulically, to a plurality of wheel brakes 10, wheel brakes 10 being individually controllable by brake unit 9. Thus, brake unit 9 is realized for example as an ABS or ESP unit of brake system 3.

Steering system 4 has a steering actuator 11 that is connected by a steering linkage to the wheels 12 of a front wheel axle of motor vehicle 1 in order to set the steering angle thereof. Actuator 11 can for example be a component of a power steering device that, in the normal case, supports the driver of motor vehicle 1 when carrying out a steering process. However, in the present case actuator 11 is also controllable by control device 5 independent of actuation by a driver in order to carry out a steering process in automated or fully autonomous fashion.

In order to carry out a short path driving maneuver, such as entering or leaving a parking space, drive system 2, brake system 3, and steering system 4 are controlled by control device 5 in order to carry out this short path driving process (fully) autonomously. In order to monitor the driving process, rotational speed sensors 13, connected to control device 5, are assigned to each of wheels 8 and 12. As a function of a setting of the angle of rotation of wheels 8, 12, rotational speed sensors 13 produce signal pulses that are acquired or received by control device 5.

For this purpose, sensors 13 have a signal receiver attached to the chassis and a signal emitter that rotates with the respective wheel 8, 12, the signal emitter being configured such that a plurality of signal pulses is produced for a rotation of each wheel 8, 12. The so-called "ticks" of the signal emitter, which produced the signal pulse, are distributed uniformly around the circumference of the respective wheel 8, 12. By counting and acquiring the ticks, or the signal pulses, a path traveled by the respective wheel 8, 12 is thus ascertainable. Here, the outer circumference of the respective wheel 8, 12 and the number of acquired signal pulses, and the number of signal pulses of the respective wheel 8, 12 provided for one rotation, are taken into account. Through a simple calculation, the path traveled by motor vehicle 1 can thus be ascertained as a function of the number of produced and acquired signal pulses.

Figure 2:
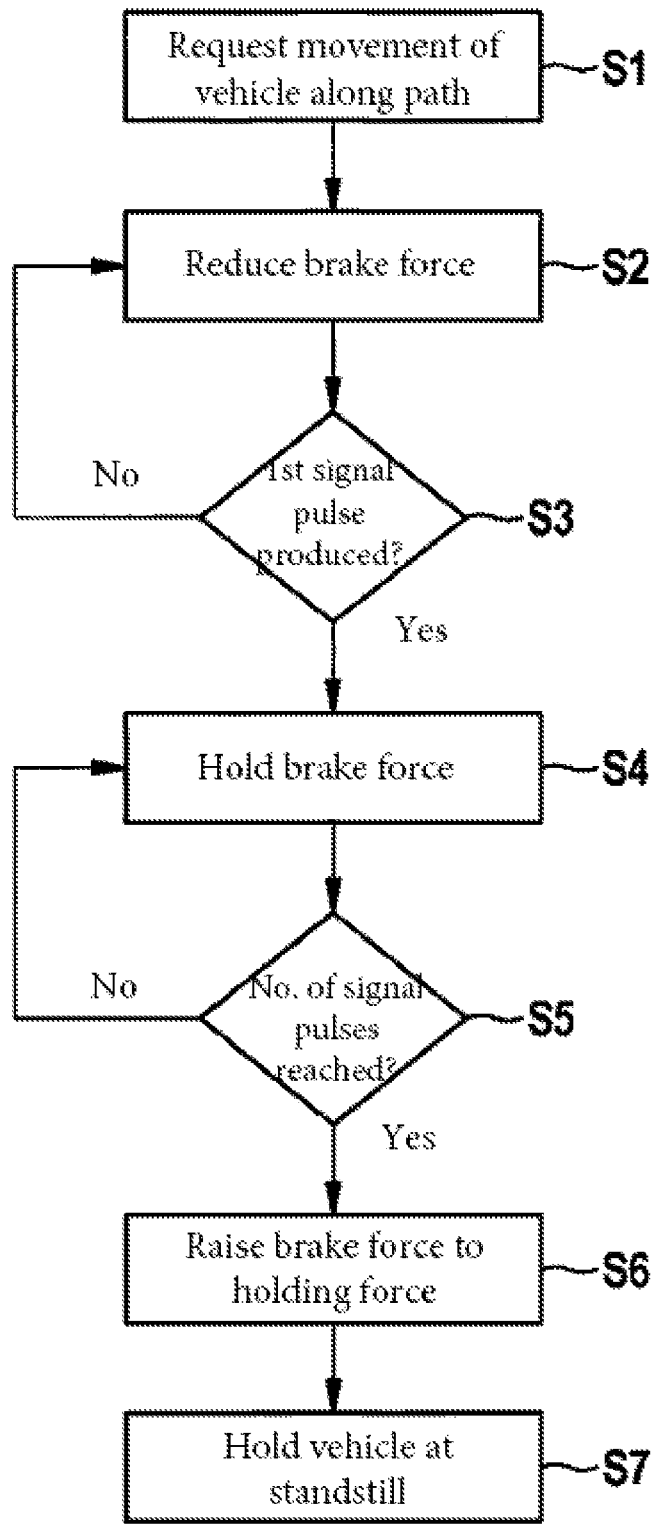
FIG. 2 shows a method for operating the motor vehicle on the basis of a simplified flow diagram.

On the basis of FIG. 2, the advantageous method for operating a motor vehicle is explained in more detail using a flow diagram.

At the beginning of the method, in a step S1 a path is requested along which motor vehicle 1 is to move. This request comes for example from a parking assistant device or function that determines, as a function of the current surrounding environment of the motor vehicle acquired by a sensor system provided for this purpose, a path (trajectory) necessary for (for example) entering or leaving a parking space. The ascertaining of the request to steering system 4 is not discussed in more detail here, because it is independent of the method described in the following for requesting a movement. For this purpose, methods known from the existing art can be used. As a function of the requested path, the signal pulses to be acquired are ascertained, which correspond to the requested path when the respective wheel 8, 12 rotates correspondingly.

Here it is assumed that in the initial situation motor vehicle 1 is at a standstill and brake system 9 is activated in order to hold motor vehicle 1 at a standstill with a holding force produced by wheel brakes 10.

Figure 3:
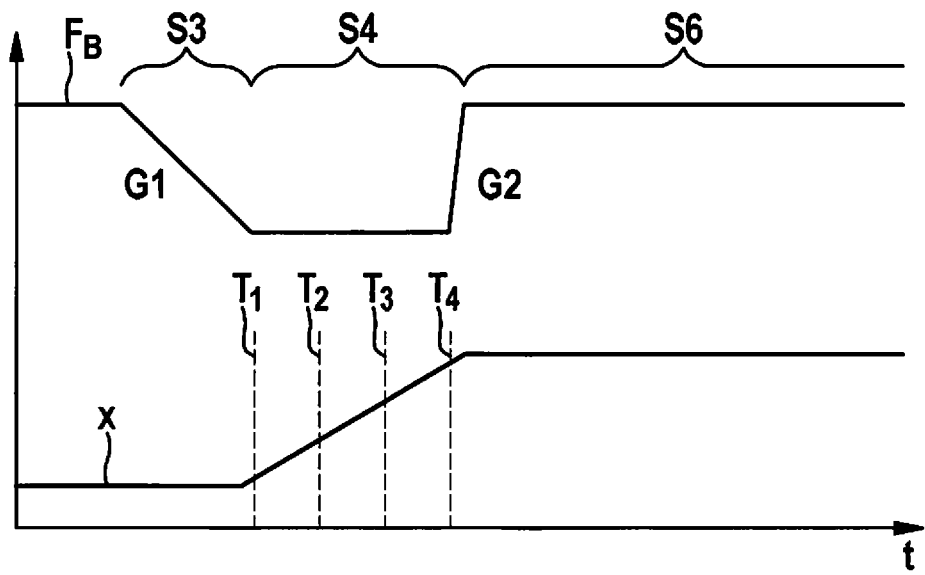
FIG. 3 shows a diagram explaining a first exemplary embodiment of the method.

Matching this exemplary embodiment, FIG. 3 shows a diagram on the basis of which the first exemplary embodiment of the advantageous method is to be explained. In the diagram, the following are shown over time t: brake force $F_B$ set by wheel brakes 10, path x traveled by the vehicle, and produced signal pulses T acquired by control device 5.

In step S2, the acting brake force $F_B$ is first reduced. Here, in the present case brake force $F_B$ is reduced along a specified ramp G1, as shown in FIG. 3. Ramp G1 specifies only the slope of the brake force reduction over time. In this case, ramp G1 is realized as a linear ramp. However, this is only an advantageous exemplary embodiment. According to another exemplary embodiment, the brake force can be reduced over time by ramp G1 having a different curve, for example an exponential curve. Other ramp shapes are also conceivable.

In a following step S3, rotational speed sensors 13 are monitored to check whether they produce a first signal pulse $T_1$. In the present case, it is first assumed that only one rotational speed sensor 13 is present or is monitored by control device 5. If no signal pulse is acquired (n), then the method returns to step S2. Only when a first signal pulse $T_1$ has been acquired does the method move to the subsequent step (j) S4. In step S4, brake force $F_B$ is held constant with the acquisition of first signal pulse $T_1$, as shown in FIG. 3. Moreover, the signal pulses $T_2$ to $T_4$, now produced by rotational speed sensor 13, are counted. In the present exemplary embodiment, a total of four signal pulses are expected that are to be produced when traveling the requested path. Through a simple query in step S5 it is checked whether the required number of signal pulses has been reached. If this is not the case (n), then the method returns to step S4. However, if the required number of signal pulses has been reached (j) then the method moves to the following step S6, in which the braking force is increased until the holding force is reached, as shown in FIG. 3. In step S6, the brake force is again increased with the gradient or ramp G2, which is steeper than ramp G1, in order to ensure a rapid braking of motor vehicle 1. Further signal pulses can then no longer be acquired or counted. This may be verified by further monitoring of rotational speed sensor 13. If, despite the production of the holding force, a further signal pulse is acquired, then a warning message may be outputted. In the following step S7, the motor vehicle is held at a standstill until there is a further request to travel a path.

Figure 4:
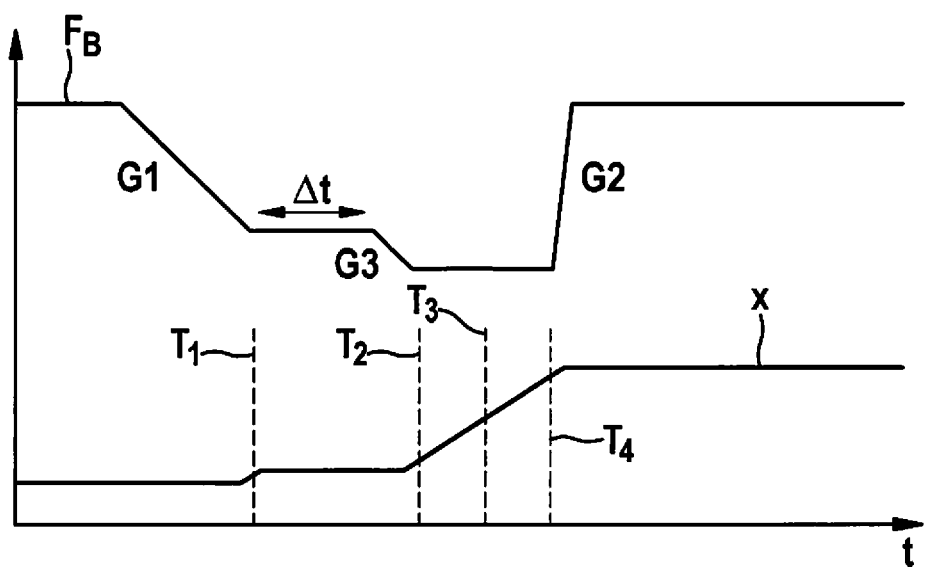
FIG. 4 shows a diagram explaining a second exemplary embodiment of the method.

On the basis of the diagram shown in FIG. 4, a second exemplary embodiment of the advantageous method is explained. Differing from the preceding exemplary embodiment, after the acquisition of first signal pulse $T_1$ a time span $\Delta t$ is additionally acquired and is compared with a specified time duration $\Delta t_{max}$. The time span is measured until a further signal pulse $T_2$ is acquired. At this time, the time span measurement is terminated. However, if no further signal pulse occurs within the acquired time span up until the maximum time duration $\Delta t_{max}$ is reached, then brake force $F_B$ is again reduced, this time according to the gradient or ramp G3, as shown in FIG. 4.

Here, the braking force is reduced until the next signal pulse 12 is produced or ascertained, whereupon the brake force is again held constant. Upon acquisition of the final signal pulse $T_4$, the method proceeds analogously to the preceding exemplary embodiment. The present exemplary embodiment has the advantage that the requested path is traveled even in the case of an unintentional standstill after the first movement. In this way, the robustness of the function is increased. The ramps G2 and/or G3 are also realized with a linear curve according to the present exemplary embodiment. As described above in relation to ramp G1, however, ramps G2 and/or G3 can also have a different curve, for example an exponential curve.

Figure 5:
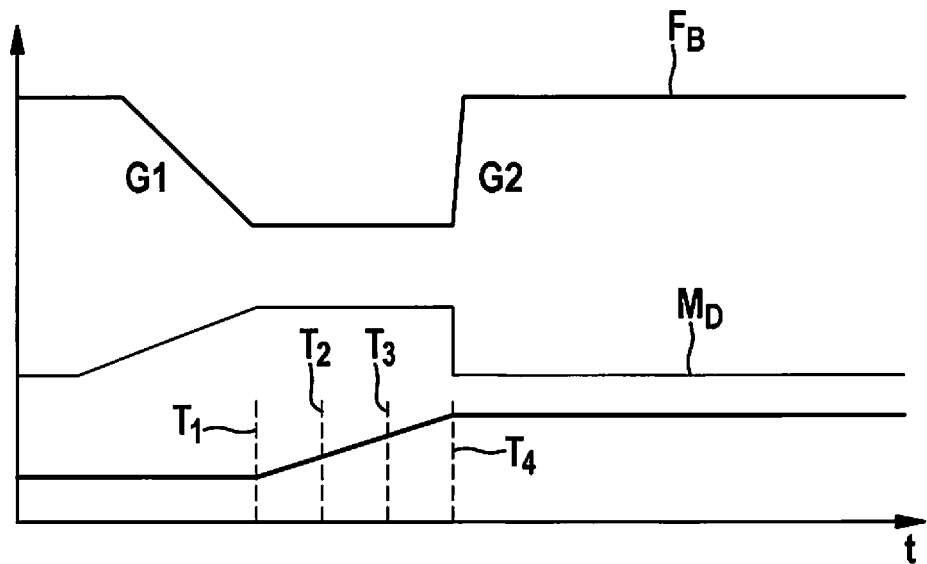
FIG. 5 shows a diagram explaining a third exemplary embodiment of the method.

On the basis of the diagram shown in FIG. 5, a third exemplary embodiment of the advantageous method is explained. Here it is provided that for starting from the standstill, not only the braking moment or braking force is reduced, but also a drive torque $M_d$ of drive device 6 is increased until a first signal pulse $T_1$ is produced or acquired. Here it is particularly advantageous to calibrate the increase of the drive torque $M_d$ and the reduction of the brake force $F_B$ in such a way that on an incline of the roadway on which the motor vehicle is situated there results an equilibrium of torque, so that a rolling back of motor vehicle 1 is reliably avoided. As soon as the final signal pulse 14 is ascertained, drive torque $M_d$ is again taken back or reduced. This specific embodiment has the advantage that starting is ensured even given a positive slope, in particular without rolling back. This further increases the robustness of the method.

Figure 6:
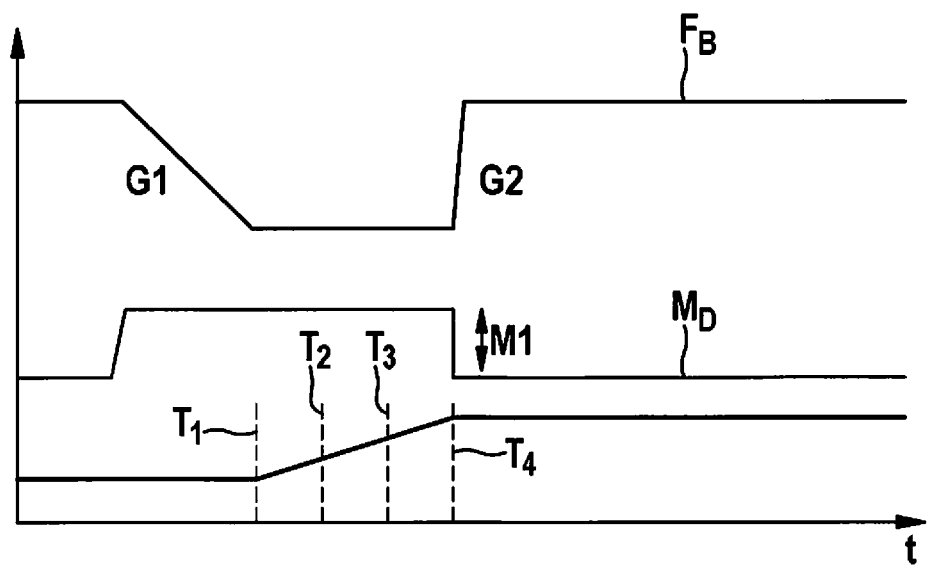
FIG. 6 shows a diagram explaining a fourth exemplary embodiment of the method.

FIG. 6 shows, in a diagram, a fourth exemplary embodiment of the advantageous method, this exemplary embodiment differing from the preceding exemplary embodiment in that drive torque $M_d$ is already increased to a drive torque $M_1$ before the brake force is reduced. The drive torque is not reduced until the final signal pulse $T_4$ is reached. It is advantageous if the value $M_1$ is chosen to be a function of the slope, a higher drive torque $M_1$, which can also be a function of the vehicle, being chosen for a greater slope. The slope can be acquired for example by an inclination sensor 14. This has the advantage that the vehicle is already tensioned while at a standstill, and when brake force $F_B$ is reduced the acting drive torque reliably prevents the motor vehicle from rolling back.

According to a further exemplary embodiment (not shown), the changes in the brake force and/or in the drive torque are not carried out until a signal pulse has been produced by each of at least two rotational speed sensors 13. This has the advantage that in the case of a bouncing of a signal pulse, for example because the motor vehicle is moving very slowly and the sensor is therefore standing for long time at the threshold of a signal pulse, a beginning movement of the motor vehicle is robustly ascertained.

For the case in which the requested path cannot be divided by the signal pulse length without a remainder, advantageously a whole-number rounding, in particular rounding down, is carried out in order to increase the probability that the traveled path will never exceed the requested path. This increases the safety of the driving maneuver.

The braking process, or the increase in the brake force, in principle may be introduced with the next-to-last signal pulse before the last signal pulse to be acquired. As in the present case, in this way the brake process may be introduced, or the brake force is increased, already at signal pulse $T_3$. In this case, the path additionally traveled during the braking process is at least approximately compensated by the blind travel before first signal pulse $T_1$ when starting. In this way, the requested path can be achieved more precisely.

The distances in the signal pulses along the circumference of the respective wheel 8, 12 may be selected such that distance a is 0.1 mm to 30 mm, which may be 5 mm to 15 mm. Brake force ramps G1, G2 and/or G3 may be 0.1 bar/s to 50 bar/s, which may be 0.5 bar/s to 5 bar/s. Here, requested paths between 0.5 cm to 5 m, which may be 2 cm to 50 cm, are assumed, corresponding to a short path driving maneuver. The specified time duration $\Delta t_{max}$ with which the measured time span $\Delta t$ is compared is specified as 0.5 s to 20 s, which may be 1 s to 5 s. The drive torque $M_1$ to be set according to the exemplary embodiment of FIG. 6 may be specified as from 30 Nm to 5000 Nm, in particular 50 Nm to 2000 Nm.

According to a further exemplary embodiment, the holding of the motor vehicle, i.e. the increase of brake force $F_B$, is introduced only when at least one temporally first signal pulse $T_1$ is received from, or produced by, each of at least two wheels or two rotational speed sensors 13. In this way, the segment length of wheel 8, 12 is determined that has the largest distance from the next signal pulse. This has the advantage that very short segments, or paths, can be carried out, in the region of the signal pulse distances. The holding of motor vehicle 1, i.e. the increase of the brake force to the holding force, need not be introduced until a first signal pulse $T_1$ has been produced by each of all the available rotational speed sensors. If the large number of all of the very short segments carried out in this way is considered, then with each additional rotational speed sensor the statistical scatter of the segment length is reduced. In this way, the reproducibility and usability of this described assistance function are increased.

What is claimed is:

1. A method for operating a motor vehicle, capable of partly or fully autonomous driving, having a plurality of wheels, the method comprising:
   automatically producing, by the motor vehicle, a drive torque at at least one of the plurality of wheels;
   producing, via a brake system, at least one brake force that each, when at a respective holding force value, holds still a respective one of the plurality of wheels, wherein a respective rotational speed sensor is allocated to at least one of the plurality of wheels of the motor vehicle;
   producing, via the respective rotational speed sensor and respectively for each respective wheel of at least one of the plurality of wheels of the motor vehicle, a respective signal pulse for each of a plurality of positions of angular rotation of the respective wheel; and
   performing a specifiable driving maneuver, wherein the performing of the specifiable driving maneuver includes, in a case of a driving process starting from a standstill:
   reducing the at least one brake force until the respective rotational speed sensor produces a first signal pulse;
   after the production of the first signal pulse, holding the at least one brake force constant;
   acquiring a time duration starting from the production of the first signal pulse at which point the holding constant of the at least one brake force begins;
   comparing the acquired time duration with a specifiable time span;
   responsive to the acquired time duration exceeding the specifiable time span, further reducing the at least one brake force; and
   responsive to production of a specified number of signal pulses corresponding to a predefined travel distance, increasing the at least one brake force up to the respective holding force value.

2. The method of claim 1, wherein the specified number of signal pulses is specified as a function of a path to be traveled.

3. The method of claim 1, wherein the drive torque is produced as a function of a slope in a direction of travel of the motor vehicle.

4. The method of claim 1, wherein the drive torque is produced in response to a specifying of the specifiable driving maneuver and before the at least one brake force is reduced.

5. The method of claim 1, wherein the respective rotational speed sensor includes a respective rotational speed sensor for each of more than one of the plurality of wheels, and the at least one brake force is not held constant or increased until a respective instance of the first signal pulse has been produced by each of at least two of the respective rotational speed sensors.

6. The method of claim 5, wherein the at least one brake force is not increased until the respective instance of the first signal pulse has been produced by all the respective rotational speed sensors.

7. The method of claim 1, wherein:
- the respective rotational speed sensor includes a respective rotational speed sensor for each of more than one of the plurality of wheels; and
- the drive torque is reduced during execution of the specifiable driving maneuver only when a respective instance of the first signal pulse has been produced by at least two of the respective rotational speed sensors.

8. The method of claim 1, wherein, after the further reduction of the at least one brake force, which occurs after the production of the first signal pulse, the at least one brake force is, in response to production of a second signal pulse that immediately follows the first signal pulse, again held constant until the production of the specified number of signal pulses.

9. A motor vehicle capable of fully or partly autonomous driving, the motor vehicle comprising:
- a plurality of wheels;
- a brake system; and
- a rotational speed sensor;

wherein:
- the rotational speed sensor is configured to produce, respectively for each respective wheel of at least one of the plurality of wheels of the motor vehicle, a respective signal pulse for each of a plurality of positions of angular rotation of the respective wheel;
- the motor vehicle is configured to perform a specifiable driving maneuver starting from a standstill of the motor vehicle by:
  - reducing a brake force of the brake system until the rotational speed sensor produces a first signal pulse;
  - after the production of the first signal pulse, holding the brake force constant;
  - acquiring a time duration starting from the production of the first signal pulse at which point the holding constant of the brake force begins;
  - comparing the acquired time duration with a specifiable time span;
  - responsive to the acquired time duration exceeding the specifiable time span, further reducing the brake force; and
  - responsive to production of a specified number of signal pulses corresponding to a predefined travel distance, increasing the brake force up to a holding force value at which the brake force holds still at least one of the plurality of wheels.

10. A method for operating a motor vehicle, capable of partly or fully autonomous driving, having a plurality of wheels, the method comprising:
- producing, via a brake system, at least one brake force that each, when at a respective holding force value, holds still a respective one of the plurality of wheels, a respective rotational speed sensor being allocated to at least one of the plurality of wheels of the motor vehicle, wherein the respective rotational speed sensor is configured to produce, respectively for each respective wheel of at least one of the plurality of wheels of the motor vehicle, a respective signal pulse for each of a plurality of positions of angular rotation of the each respective wheel; and
- performing a specifiable driving maneuver, by which the motor vehicle moves in a particular direction, the performing being in response to a specifying of the specifiable driving maneuver that occurs while the motor vehicle is at a standstill due to the at least one brake force, wherein the performing of the specifiable driving maneuver includes:
  - while the motor vehicle is still at the standstill, the motor vehicle producing a drive torque at at least one of the plurality of wheels that applies a force to the motor vehicle in the particular direction, the motor vehicle being maintained at the standstill while the produced drive torque is present at the at least one of the plurality of wheels;
  - subsequent to the production of the drive torque, reducing the at least one brake force until the respective rotational speed sensor produces a first signal pulse;
  - after the production of the first signal pulse, holding the at least one brake force constant until a specified number of signal pulses, corresponding to a predefined travel distance, has been produced; and
  - responsive to the production of the specified number of signal pulses, increasing the at least one brake force up to the holding force value.

11. The method of claim 10, wherein the specified number of signal pulses is specified as a function of a path to be traveled.

12. The method of claim 10, wherein the motor vehicle automatically produces the drive torque.

13. The method of claim 10, wherein the drive torque is produced as a function of a slope in a direction of travel of the motor vehicle.

14. The method of claim 10, wherein the respective rotational speed sensor includes a respective rotational speed sensor for each of more than one of the plurality of wheels, and the at least one brake force is not increased until a respective instance of the specified number of signal pulses has been produced by each of at least two of the respective rotational speed sensors.

15. The method of claim 14, wherein the at least one brake force is not increased until the respective instance of the specified number of signal pulses has been produced by all the respective rotational speed sensors.

16. The method of claim 10, wherein:
- the respective rotational speed sensor includes a respective rotational speed sensor for each of more than one of the plurality of wheels; and
- the drive torque is reduced during execution of the specifiable driving maneuver only once a respective instance of the first signal pulse has been produced by at least two of the respective rotational speed sensors.

17. The method of claim 10, wherein:
- a time duration, starting from the production of the first signal pulse at which point the holding constant of the at least one brake force begins, is acquired and is compared with a specifiable time span;
- responsive to the time duration exceeding the specifiable time span, the at least one brake force is further reduced prior to the increasing of the at least one brake force up to the holding force value; and
- after the further reduction of the at least one brake force, which occurs after the production of the first signal pulse, the at least one brake force is again held constant in response to production of a second signal pulse that immediately follows the first signal pulse.

18. A motor vehicle capable of fully or partly autonomous driving, the motor vehicle comprising:
- a plurality of wheels;
- a brake system; and
- a rotational speed sensor;

wherein:
the brake system is configured to produce at least one brake force that each, when at a respective holding force value, holds still a respective one of the plurality of wheels;
the rotational speed sensor is configured to produce, respectively for each respective wheel of at least one of the plurality of wheels of the motor vehicle, a respective signal pulse for each of a plurality of positions of angular rotation of the each respective wheel;
the motor vehicle is configured to perform a specifiable driving maneuver, by which the motor vehicle moves in a particular direction, the performing being in response to a specifying of the specifiable driving maneuver that occurs while the motor vehicle is at a standstill due to the at least one brake force; and
the performance of the specifiable driving maneuver includes:
while the motor vehicle is still at the standstill, the motor vehicle producing a drive torque at at least one of the plurality of wheels that applies a force to the motor vehicle in the particular direction, the motor vehicle being maintained at the standstill while the produced drive torque is present at the at least one of the plurality of wheels;
subsequent to the production of the drive torque, reducing the at least one brake force until the rotational speed sensor produces a first signal pulse;
after the production of the first signal pulse, holding the at least one brake force constant until a specified number of signal pulses, corresponding to a predefined travel distance, has been produced by the rotational speed sensor; and
responsive to the production of the specified number of signal pulses, increasing the at least one brake force up to the holding force value.

* * * * *